United States Patent
Wang et al.

(10) Patent No.: US 9,228,719 B2
(45) Date of Patent: Jan. 5, 2016

(54) ILLUMINATION SYSTEM AND PROJECTION APPARATUS

(71) Applicants: Chi-Hsun Wang, Hsin-Chu (TW); Ko-Shun Chen, Hsin-Chu (TW)

(72) Inventors: Chi-Hsun Wang, Hsin-Chu (TW); Ko-Shun Chen, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 238 days.

(21) Appl. No.: 13/772,345

(22) Filed: Feb. 21, 2013

(65) Prior Publication Data
US 2013/0321777 A1    Dec. 5, 2013

(30) Foreign Application Priority Data

May 29, 2012    (CN) .......................... 2012 1 0171163

(51) Int. Cl.
| | |
|---|---|
| G03B 21/00 | (2006.01) |
| F21V 13/08 | (2006.01) |
| G03B 21/20 | (2006.01) |
| G03B 21/14 | (2006.01) |

(52) U.S. Cl.
CPC ................ *F21V 13/08* (2013.01); *G03B 21/14* (2013.01); *G03B 21/204* (2013.01); *G03B 21/2013* (2013.01); *G03B 21/2066* (2013.01)

(58) Field of Classification Search
CPC .......................... G03B 21/204; G03B 21/2033
USPC ............................... 353/31, 98; 362/555, 553
See application file for complete search history.

(56) References Cited

U.S. PATENT DOCUMENTS

| | | | |
|---|---|---|---|
| 6,552,754 B1 | 4/2003 | Song et al. | |
| 2002/0191395 A1* | 12/2002 | Fleury | ........................... 362/236 |
| 2010/0118530 A1* | 5/2010 | Nagai | ........................... 362/235 |
| 2010/0328633 A1 | 12/2010 | Sato et al. | |
| 2011/0211333 A1* | 9/2011 | Bartlett | ........................... 362/84 |
| 2012/0062857 A1* | 3/2012 | Saitou et al. | .................... 353/98 |

FOREIGN PATENT DOCUMENTS

| | | |
|---|---|---|
| CN | 102235618 | 11/2011 |
| EP | 1471746 | 10/2004 |
| WO | 2006027621 | 3/2006 |

OTHER PUBLICATIONS

"Office Action of China Counterpart Application", issued on Dec. 15, 2014, p.1-p.11, in which the listed references were cited.

* cited by examiner

*Primary Examiner* — Sultan Chowdhury
*Assistant Examiner* — Danell L Owens
(74) *Attorney, Agent, or Firm* — Jianq Chyun IP Office

(57) ABSTRACT

An illumination system including a plurality of first light emitting elements, a wavelength-converting unit, a first reflector and a second reflector is provided. The first light emitting elements respectively emit a plurality of exciting beams. The wavelength-converting unit is disposed on transmission paths of the exciting beams and converts the exciting beams into a first color light beam. The first reflector is disposed on the transmission paths of the exciting beams, and disposed between the first light emitting elements and the wavelength-converting unit. The first reflector has a hole. The exciting beams from the first light emitting elements are reflected by the first reflector. The second reflector reflects the exciting beams, reflected by the first reflector, to the wavelength-converting unit. The exciting beam reflected by the second reflector is transmitted to the wavelength-converting unit through the hole. A projection apparatus is also provided.

16 Claims, 4 Drawing Sheets

ILLUMINATION SYSTEM AND PROJECTION APPARATUS

CROSS-REFERENCE TO RELATED APPLICATION

This application claims the priority benefit of China application serial no. 201210171163.7, filed on May 29, 2012. The entirety of the above-mentioned patent application is hereby incorporated by reference herein and made a part of this specification.

BACKGROUND OF THE INVENTION

1. Field of Invention

The invention relates to an optical system and a display apparatus, and more particularly, to an illumination system and a projection apparatus.

2. Background

Recently, projection apparatuses using solid state light sources such as light emitting diodes (LEDs) and laser diodes have gradually held considerable market share. The luminescence efficiency of the LEDs is about 5% to 8%, and the LEDs have different spectrums available for selection, including red, green and blue spectrums. The LEDs have high spectrum peak value and narrow spectrum width and can be used as pure color light sources for projectors.

In addition, due to the luminescence limitation of the LEDs as light sources, conventional illumination systems of a projection apparatus use an exciting beam emitted by an exciting light sources, such as a laser light source, to excite a phosphor for producing light beams with higher intensity. In order to effectively excite the phosphor with the exciting beam, a cross-sectional area of the exciting beam is usually reduced, so that the exciting beam is focused to excite the phosphor. However, as conventional illumination systems using a plurality of lenses to reduce the cross-sectional area of the exciting beam, a distance is also required for reducing the cross-sectional area of the exciting beam to be suitable for exciting the phosphor, wherein the distance makes it difficult for reducing the volume of the illumination system. Additionally, when using a lens having a larger diameter to focus the exciting beam having a larger cross-sectional area, the cost of the illumination system may also be increased due to the increased cost of the lens.

US Patent Application Publication No. 20100328633 discloses a light source device including a light-source set and a first reflecting mirror set. In addition, U.S. Pat. No. 6,552,754 discloses a laser video projector.

SUMMARY OF THE INVENTION

Accordingly, the invention is directed to an illumination system having a framework of miniaturization.

The invention is also directed to a projection apparatus having a framework of miniaturization.

Other advantages of the invention could be further comprehended from the technical features disclosed in the invention.

One embodiment of the invention provides an illumination system including a plurality of first light emitting elements, a wavelength-converting unit, a first reflector and a second reflector. The first light emitting elements respectively emit a plurality of exciting beams. The wavelength-converting unit is disposed on transmission paths of the exciting beams and converts the exciting beams into a first color light beam. A wavelength of the first color light beam is different from a wavelength of the exciting beams. The first reflector is disposed on the transmission paths of the exciting beams and disposed between the first light emitting elements and the wavelength-converting unit. The first reflector has a hole. The exciting beams from the first light emitting elements are reflected by the first reflector. The second reflector is disposed between the first light emitting elements and the first reflector. The second reflector reflects the exciting beams, reflected by the first reflector, to the wavelength-converting unit. The exciting beams reflected by the second reflector are transmitted to the wavelength-converting unit through the hole.

Another embodiment of the invention provides a projection apparatus including the above illumination system, a light valve and a projection lens. The light valve is disposed on the transmission path of the first color light beam to convert the first color light beam into an image light beam. The projection lens is disposed on a transmission path of the image light beam.

Embodiments of the invention may have at least one of the following advantages. In the illumination system and projection apparatus of embodiments of the invention, the exciting beams are reflected by the first reflector to the second reflector, and the exciting beams are then reflected by the second reflector to the hole of the first reflector. As such, the effect of folding the optical path length of light could be achieved. As a result, the optical path length of the exciting beams transmitting from the first light emitting elements to the first reflector, the optical path length of the exciting beams transmitting from the first reflector to the second reflector, and the optical path length of the exciting beams transmitting from the second reflector to the hole of the first reflector share the distance between the first reflector and the second reflector, and thus the spaces may be effectively used. Thereby, the volume of the illumination system and the projection apparatus could be effectively reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
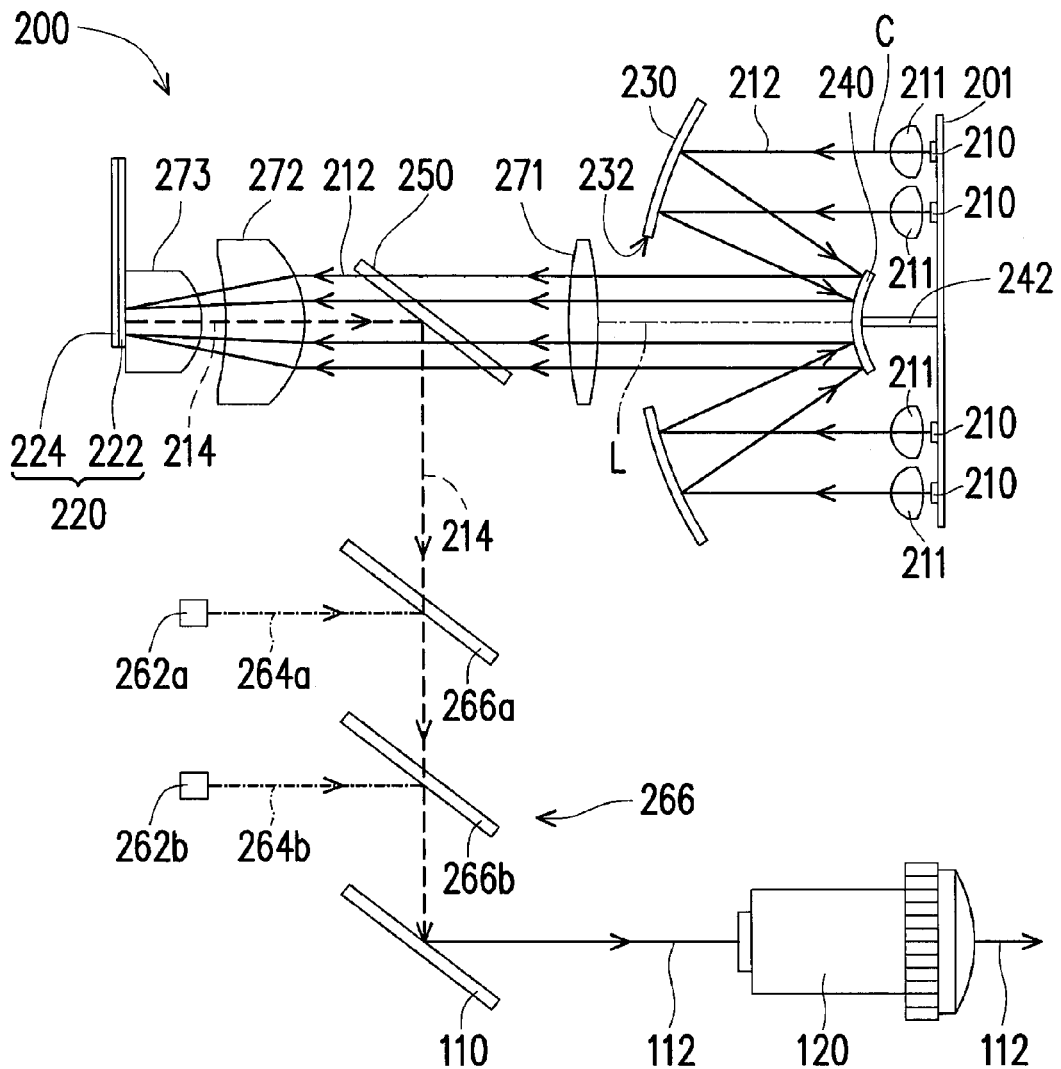
FIG. 1A illustrates a projection apparatus according to one embodiment of the invention.

FIG. 1A illustrates a projection apparatus according to one embodiment of the invention. Referring to FIG. 1A, the projection apparatus 100a in this embodiment includes an illumination system 200, a light valve 110 and a projection lens 120. The illumination system 200 includes a plurality of first light emitting elements 210, a wavelength-converting unit 220, a first reflector 230, and a second reflector 240.

Figure 1B:
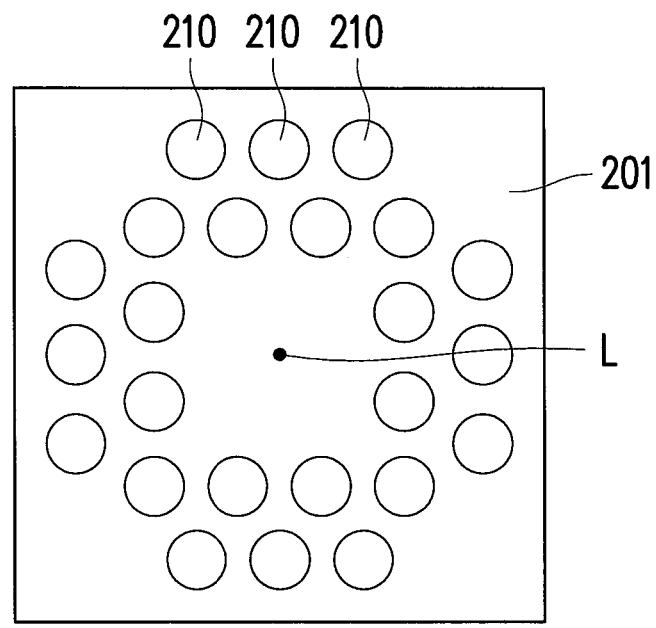
FIG. 1B is a front view of first light emitting elements of FIG. 1A.

The first light emitting elements 210 are capable of emitting a plurality of exciting beams 212. In the embodiment, the first light emitting element 210 is, for example, a laser diode or any other suitable laser generator, and the exciting beam 212 is, for example, a blue laser beam. In another embodiment, the first light emitting element 210 is, for example, a light source of a light emitting diode (LED) or any other suitable light source, and the exciting beam 212 may also be a beam of different colors, such as an ultraviolet beam. Specifically, as shown in FIG. 1B, the first light emitting elements 210 in the embodiment may be disposed on a supporting substrate 201, and the first light emitting elements 210 may surround a central axis L of the second reflector 240. Although the number of the first light emitting elements 210 shown in FIG. 1B is 24, it should be noted that the number of the first light emitting elements 210 is not limited in the embodiment. A person having ordinary skill in the art may change the number of the first light emitting elements based on actual design demands with reference to the teachings of the embodiment. In addition, as shown in FIG. 1A, a plurality of collimator lenses 211 may be respectively disposed on the transmission paths of the exciting beams 212 emitted by the first light emitting elements 210, wherein the collimator lenses 211 are capable of collimating the exciting beams 212 emitted by the first light emitting elements 210.

The wavelength-converting unit 220 is disposed on transmission paths of the exciting beams 212. The wavelength-converting unit 220 is configured to convert the exciting beams 212 into a first color light beam 214, wherein a wavelength of the first color light beam 214 is different from wavelengths of the exciting beams 212. For instance, the wavelength-converting unit 220 includes a reflecting substrate 224 and a phosphor layer 222 disposed on the reflecting substrate 224. The phosphor layer 222 is, for example, a green phosphor layer or another phosphor layer of different colors. When the exciting beams 212, such as blue light beams, strike the wavelength-converting unit 220, the first color light beam 214, such as a green light beam, is then excited and generated. Specifically, the phosphor layer 222 is capable of converting blue exciting beams 212 into the first color light beam 214 of green, and the reflecting substrate 224 is capable of reflecting the first color light beam 214 converted by the phosphor layer 222. In another embodiment, a transparent substrate 224 may be used instead of the reflecting substrate, so that the first color light beam 214 converted by the phosphor layer 222 may penetrate through the transparent substrate 224. In another embodiment, the phosphor powder may also be mixed into the transparent substrate, which may be used as the wavelength-converting unit.

Figure 1C:
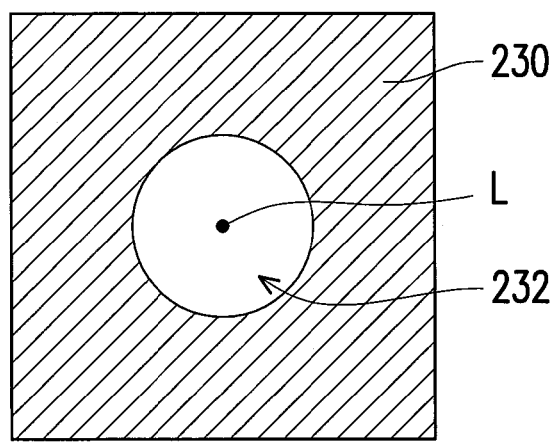
FIG. 1C is a front view of a first reflector of FIG. 1A.

FIG. 1C is a front view of a first reflector of FIG. 1A. Referring to FIG. 1C and FIG. 1A, the first reflector 230 is disposed on the transmission paths of the exciting beams 212 and disposed between the first light emitting elements 210 and the wavelength-converting unit 220. The first reflector 230 has a hole 232, and the exciting beams 212 from the first light emitting elements 210 are reflected by the first reflector 230. In the embodiment, the first reflector 230 is a concave mirror or any other element having a function of reflecting light.

The second reflector 240 is disposed between the first light emitting elements 210 and the first reflector 230. The second reflector 240 is capable of reflecting the exciting beams 212, reflected by the first reflector 230, to the wavelength-converting unit 220, wherein the exciting beams 212 reflected by the second reflector 240 are transmitted to the wavelength-converting unit 220 through the hole 232. In the embodiment, the second reflector 240 is a convex mirror or any other element having a function of reflecting light. In addition, a locking component 242, such as a screw or latches, may be optionally disposed. The locking component 242 is capable of fixing the second reflector 240 onto the supporting substrate 201 of the first light emitting elements 210, and the locking component 242 may also be replaced by any other element capable of fixing.

More specifically, each of the first light emitting elements 210 in the embodiment has an optical axis C, wherein the exciting beam 212 emitted by the first light emitting element 210 is transmitted along the optical axis C. Based on collaborative configurations of the first reflector 230, the second reflector 240 and the wavelength-converting unit 220, a ray, transmitted along the optical axis C, of the exciting beams 212 emitted from the first light emitting elements 210 is reflected by the first reflector 230. Then, the ray is reflected by the second reflector 240 to penetrate through the hole 232, and is transmitted to the wavelength-converting unit 220 in sequence. As a result, most of the light energy of the exciting beams 212 is ensured to be transmitted to the wavelength-converting unit 220.

In the illumination system 200 and the projection apparatus 100a of the embodiment, the exciting beams 212 are reflected by the first reflector 230 to the second reflector 240, and the exciting beams 212 are reflected by the second reflector 240 to the hole 232 of the first reflector 230, so that the effect of folding the optical path length of light could be achieved. As a result, the optical path length of the exciting beams 212 transmitting from the first light emitting elements 210 to the first reflector 230, the optical path length of the exciting beams 212 transmitting from the first reflector 230 to the second reflector 240, and the optical path length of the exciting beams 212 transmitting from the second reflector 240 to the hole 232 of the first reflector 230 share the distance between the first reflector 230 and the second reflector 240. As such, the spaces may be effectively used. Thereby, the volume of the illumination system 200 and the projection apparatus 100a could be effectively reduced. Moreover, in the illumination system 200 and the projection apparatus 100a in this embodiment, since the first reflector 230 may be a concave mirror, the effect for reducing the cross-sectional area of the exciting beams 212 may also be achieved.

As stated above, the light valve 110 is disposed on the transmission path of the first color light beam 214 to convert the first color light beam 214 into an image light beam 112. In the embodiment, the light valve 110 is, for example, a digital micro-mirror device (DMD). In other embodiments, however, the light valve 110 may also be a liquid-crystal-on-silicon panel, a transparent type LCD panel or any other suitable spatial light modulator. In addition, the projection lens 120 is disposed on the transmission path of the image light beam 112 to project the image light beam 112 onto a screen (not shown) to produce an image.

Moreover, in the embodiment, a beam splitting unit 250 is optionally disposed on the transmission paths of the exciting beams 212 and the first color light beam 214 and disposed between the second reflector 240 and the wavelength-converting unit 220. The beam splitting unit 250 is capable of transmitting the exciting beams 212 reflected by the second reflector 240 to the wavelength-converting unit 220 and separating the first color light beam 214, coming from the wavelength-converting unit 220, from the exciting beams 212. That is, the beam splitting unit 250 is capable of transmitting the first color light beam 214 from the wavelength-converting unit 220 to the light valve 110.

To be specific, the beam splitting unit 250 in this embodiment is capable of allowing one of the exciting beam 212 and the first color light beam 214 to pass through (FIG. 1A is configured to show allowing the exciting beam 212 to pass through, for example) and capable of reflecting the other of the exciting beam 212 and the first color light beam 214 (FIG. 1A is configured to show that the first color light beam 214 is reflected, for example). In the embodiment, the beam splitting unit 250 is a dichroic unit, such as a dichroic mirror or a dichroic prism. The dichroic unit is capable of allowing one kind of color light, such as a blue exiting beam, to pass through and capable of reflecting another kind of color light, such as the first color light beam 214 of green. In another embodiment, however, the beam splitting unit 250 may also be a neutral density filter, a polarising beam splitter (PBS) or any other suitable beam splitting element.

In addition, in the embodiment shown in FIG. 1A, the projection apparatus 100a may include at least one second light emitting element 262a and a beam combining unit 266. One second light emitting element 262a and one third light emitting element 262b are shown in FIG. 1A for example. Specifically, the second light emitting element 262a is capable of emitting a second color light beam 264a, and the third light emitting element 262b is capable of emitting a third color light beam 264b. The second light emitting element 262a and the third light emitting element 262b may be any two of the red light source, the blue light source and the green light source. In FIG. 1A, the second light emitting element 262a is a blue light source and the third light emitting element 262b is a red light source, for example. In the embodiment, the second light emitting element 262a and the third light emitting element 262b are, for example, light emitting diodes. In another embodiment, however, the second light emitting element 262a and the third light emitting element 262b may also be a laser diode, a laser generator, or any other suitable light source. The beam combining unit 266 is disposed on the transmission paths of the first color light beam 214, the second color light beam 264a and the third color light beam 264b. The beam combining unit 266 is capable of combining the first color light beam 214, the second color light beam 264a and the third color light beam 264b and capable of transmitting the first color light beam 214, the second color light beam 264a and the third color light beam 264b to the light valve 110. The light valve 110 may further convert the first color light beam 214, the second color light beam 264a and the third color light beam 264b into the image light beam 112.

Specifically, the beam combining unit 266 may include a dichroic unit 266a and a dichroic unit 266b. The dichroic unit 266a is disposed on the transmission paths of the first color light beam 214 and the second color light beam 264a. The dichroic unit 266a is capable of reflecting one of the first color light beam 214 and the second color light beam 264a (FIG. 1A is configured to show that the second color light beam 264a is reflected for example) and capable of allowing the other of the first color light beam 214 and the second color light beam 264a to pass through (FIG. 1A is configured to show allowing the first color light beam 214 to pass through, for example). The dichroic unit 266b is disposed on the transmission paths of the first color light beam 214, the second color light beam 264a and the third color light beam 264b. The dichroic unit 266b is capable of reflecting one of the third color light beam 264b, the first color light beam 214 and the second color light beam 264a (FIG. 1A is configured to show that the third color light beam 264b is reflected for example) and capable of allowing the other of the first color light beam 214, the second color light beam 264a and the third color light beam 264b to pass through (FIG. 1A is configured to show allowing the first color light beam 214 and the second color light beam 264a to pass through for example). As a result, the first color light beam 214, the second color light beam 264a and the third color light beam 264b may be transmitted through the beam combining unit 266 to the light valve 110, and the light valve 110 further converts the first color light beam 214, the second color light beam 264a and the third color light beam 264b into the image light beam 112. Additionally, in the embodiment, the second light emitting element 262a and the third light emitting element 262b may be disposed separately, and the second color light beam 264a and the third color light beam 264b are combined by the dichroic unit 266b. In another embodiment, however, the second light emitting element 262a and the third light emitting element 262b may also be integrated together, such as being integrated in an array of light-emitting elements (not shown). Here, the dichroic unit 266b may not be disposed, and the dichroic unit 266a is capable of combining the first color light beam 214, the second color light beam 264a and the third color light beam 264b.

Additionally, in the embodiment, a plurality of lenses, such as lenses 271, 272 and 273, may be optionally disposed on the light path depending upon actual requirements. In the embodiment, the lens 271 is disposed between the beam splitting unit 250 and the first reflector 230, and the lenses 272 and 273 are disposed between the wavelength-converting unit 220 and the beam splitting unit 250. The lenses 271, 272 and 273 may converge the exciting beams 212 on the wavelength-converting unit 220, and the lenses 272 and 273 may also converge the first color light beam 214 converted by the wavelength-converting unit 220. In addition, the lenses 271, 272 and 273 are, for example, light-converging lenses. Since the cross-sectional area of the exciting beams 212 transmitted through the hole 232 is reduced, the size of the lenses 271, 272 and 273 may also be minimized so as to reduce the volume and the cost of the illumination system 200.

Figure 2A:
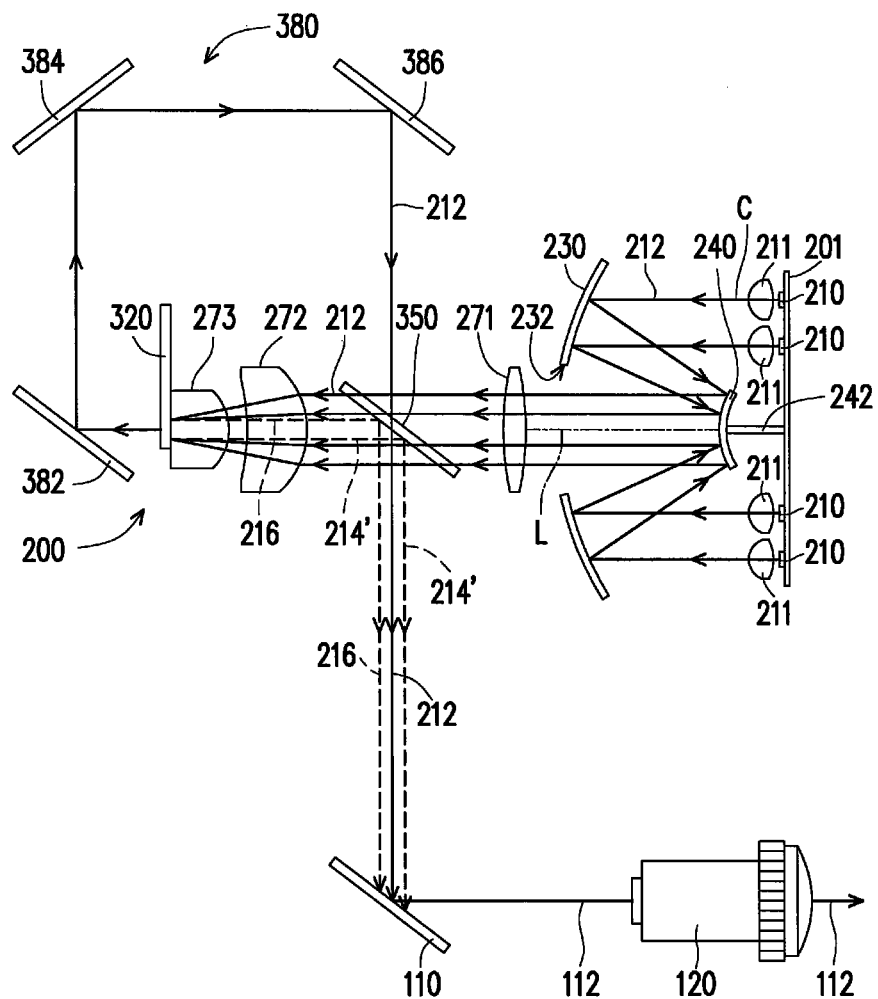
FIG. 2A illustrates a projection apparatus according to another embodiment of the invention.
Figure 2B:
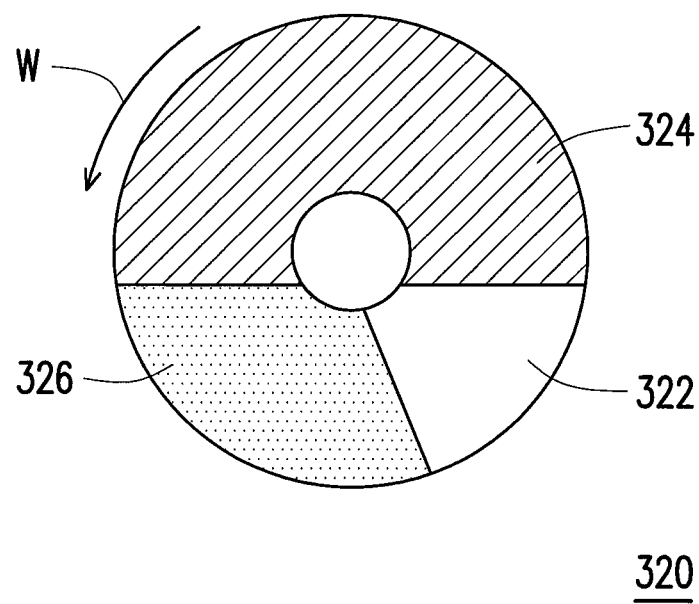
FIG. 2B is a front view of a wavelength-converting unit of FIG. 2A.

FIG. 2A illustrates a projection apparatus according to another embodiment of the invention. FIG. 2B is a front view of a wavelength-converting unit 320 of FIG. 2A. Referring to FIG. 2A and FIG. 2B, the projection apparatus 100b of the embodiment is similar to the projection apparatus 100a of FIG. 1A, with the differences described as follows. In the projection apparatus 100b of the embodiment as shown in FIG. 2A, the wavelength-converting unit 320 includes a light passing section 322 and a first phosphor reflecting section 324. The light passing section 322 and the first phosphor reflecting section 324 are capable of moving into the transmission path of the exciting beams 212 by turns. In addition, the first phosphor reflecting section 324 is capable of converting the exciting beams 212 into the first color light beam 214', and reflecting the first color light beam 214'. The light passing section 322 is capable of being passed through by the exciting beams 212.

To be specific, the light passing section 322 is a transparent section. In another embodiment, however, the light passing section 322 may be an opening having no material disposed thereat. When the light passing section 322 moves into the transmission path of the exciting beams 212, the exciting beams 212 from the first light emitting elements 210 pass through the light passing section 322. In addition, the first phosphor reflecting section 324 is formed, for example, by a reflecting substrate and a phosphor layer coated on the reflecting substrate, such that, when the first phosphor reflecting section 324 moves into the transmission path of the exciting beams 212, the exciting beams 212 excite the phosphor layer of the first phosphor reflecting section 324 to generate the first color light beam 214', and the reflecting substrate of the first phosphor reflecting section 324 reflects the first color light beam 214'. In the embodiment, the first phosphor reflecting section 324 is, for example, a green phosphor reflecting section, i.e. the phosphor layer of the first phosphor reflecting section 324 is a green phosphor layer, and the first color light beam 214' is a green light beam.

In the embodiment, the wavelength-converting unit 320 further includes a second phosphor reflecting section 326. The light passing section 322, the first phosphor reflecting section 324 and the second phosphor reflecting section 326 are capable of moving into the transmission path of the exciting beams 212 by turns. The second phosphor reflecting section 326 is capable of converting the exciting beams 212 into the second color light beam 216 and reflecting the second color light beam 216. The second phosphor reflecting section 326 is formed, for example, by a reflecting substrate and a phosphor layer coated on the reflecting substrate. In the embodiment, the phosphor layer is, for example, a red phosphor layer; that is, the second phosphor reflecting section 326 is a red phosphor reflecting section, and the second color light beam 216 is a red light beam. In the embodiment, the wavelength-converting unit 320 is a rotary wheel for rotation, such as rotating in the counterclockwise direction w, and the light passing section 322, the first phosphor reflecting section 324 and the second phosphor reflecting section 326 are each a fan-shaped section. When the wavelength-converting unit 320 rotates, the light passing section 322, the first phosphor reflecting section 324 and the second phosphor reflecting section 326 move into the transmission path of the exciting beams 212 by turns.

In the embodiment, the projection apparatus 100b further includes a beam combining unit 350. The beam combining unit 350 is disposed on the transmission paths of the exciting beams 212 reflected by the second reflector 240, the exciting beams 212 passing through the light passing section 322, and the first color light beam 214' from the first phosphor reflecting section 324 to combine the first color light beam 214' from the first phosphor reflecting section 324 and the exciting beams 212 passing through the light passing section 322. In the embodiment, the beam combining unit 350 is capable of combining the exciting beams 212 passing through the light passing section 322, the first color light beam 214' converted and reflected by the first phosphor reflecting section 324, and the second color light beam 216 converted and reflected by the second phosphor reflecting section 326.

Specifically, the beam combining unit 350 is, for example, a dichroic mirror or a dichroic prism. The beam combining unit 350 is disposed on the transmission path of the exciting beams 212, the first color light beam 214' and the second color light beam 216, and disposed between the first light emitting elements 210 and the wavelength-converting unit 320. In the embodiment, the beam combining unit 350 is capable of allowing the exciting beams 212 to pass through and capable of reflecting the first color light beam 214' and the second color light beam 216. As such, the beam combining unit 350 allows the exciting beams 212 from the first light emitting elements 210 to pass through and to travel to the wavelength-converting unit 320, and the beam combining unit 350 transmits the exciting beams 212, the first color light beam 214' and the second color light beam 216 converted and reflected by the wavelength-converting unit 320 to the light valve 110. The light valve 110 further converts the exciting beams 212, the first color light beam 214' and the second color light beam 216 into the image light beam 112.

In the embodiment, the projection apparatus 100b further includes a reflecting module 380. The reflecting module 380 may include a plurality of reflecting mirrors 382, 384 and 386. However, the number of reflecting mirrors 382, 384 and 386 is not limited in the embodiment. In another embodiment, different number of the reflecting mirrors may also be adopted. To be specific, the reflecting module 380 is disposed on the transmission paths of the exciting beams 212 passing through the light passing section 322 to reflect the exciting beams 212 passing through the light passing section 322 back to the beam combining unit 350. Specifically, when the light passing section 322 of the wavelength-converting unit 320 moves into the transmission path of the exciting beams 212, the exciting beams 212 from the first light emitting elements 210 and passing through the beam combining unit 350 passes through the light passing section 322 and is then transmitted to the reflecting mirror 382. The reflecting mirror 382 then reflects the exciting beams 212 to the reflecting mirror 384; the reflecting mirror 384 then reflects the exciting beams 212 to the reflecting mirror 386; finally, the reflecting mirror 386 reflects the exciting beams 212 to the beam combining unit 350, and the exciting beams 212 is then transmitted through the beam combining unit 350 to the light valve 110.

In addition, other components, the material thereof, the arrangement thereof, and the effects achieved thereby of the projection apparatus 100b shown in FIG. 2A, are all similar to those described in the embodiment of the projection apparatus 100a shown in FIG. 1A, and thus no further description is repeated hereinafter.

In summary, embodiments of the invention may have at least one of the following advantages. In the projection apparatus and illumination system of embodiments of the invention, the first reflector is capable of reflecting the exciting beams from the first light emitting elements to the second reflector. Then, the second reflector reflects the exciting beams to the hole of the first reflector so as to reflect the exciting beams, reflected by the first reflector, to the wavelength-converting unit, and thus the effect of folding the optical path length of light could be achieved. As a result, the projection apparatus could sufficiently make use of spaces between the first reflector and the second reflector to increase the optical path length of the exciting beams. That is, the optical path length of the exciting beams transmitted from the first light emitting elements to the first reflector, the optical path length of the exciting beams transmitted from the first reflector to the second reflector, and the optical path length of the exciting beams transmitted from the second reflector to the hole of the first reflector share the distance between the first reflector and the second reflector. As such, the spaces may be effectively used. Thereby, the volume of the illumination system and the projection apparatus could be effectively reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illumination system comprising:
    a plurality of first light emitting elements capable of emitting a plurality of exciting beams;
    a plurality of collimator lenses respectively disposed on transmission paths of the exciting beams emitted by the first light emitting elements and being capable of collimating the exciting beams emitted by the first light emitting elements;
    a wavelength-converting unit disposed on the transmission paths of the exciting beams to convert the exciting beams into a first color light beam, wherein a wavelength of the first color light beam is different from a wavelength of the exciting beams;
    a first reflector disposed on the transmission paths of the exciting beams and disposed between the first light emitting elements and the wavelength-converting unit, wherein the first reflector has a hole and the first reflector is a concave mirror, the collimators lenses are respectively disposed between the first light emitting elements and the first reflector, and the exciting beams collimated by the collimator lenses are reflected by the first reflector;
    a second reflector disposed between the first light emitting elements and the first reflector to reflect the exciting beams, reflected by the first reflector, to the wavelength-converting unit, wherein the second reflector is a convex mirror and the exciting beams reflected by the second reflector are transmitted to the wavelength-converting unit through the hole; and
    a supporting substrate, wherein the first light emitting elements are disposed on the supporting substrate to surround a central axis of the second reflector and are arranged extendedly in at least a direction perpendicular to the central axis of the second reflector, so that an optical axis of each of the first light emitting elements is parallel to the exciting beams reflected by the second reflector.

2. The illumination system according to claim 1, further comprising:
    a beam splitting unit disposed on transmission paths of the exciting beams and the first color light beam and disposed between the second reflector and the wavelength-converting unit, wherein the beam splitting unit transmits the exciting beams reflected by the second reflector to the wavelength-converting unit and separates the exciting beams and the first color light beam from the wavelength-converting unit.

3. The illumination system according to claim 2, wherein the beam splitting unit is a dichroic unit capable of allowing one of the exciting beam and the first color light beam to pass through and capable of reflecting the other of the exciting beam and the first color light beam.

4. The illumination system according to claim 2, further comprising:
    at least one second light emitting element capable of emitting a second color light beam; and
    a beam combining unit disposed on transmission paths of the first color light beam and the second color light beam to combine the first color light beam and the second color light beam.

5. The illumination system according to claim 1, wherein the wavelength-converting unit comprises a light passing section and a first phosphor reflecting section, wherein the light passing section and the first phosphor reflecting section are capable of moving into the transmission paths of the exciting beams by turns, the first phosphor reflecting section is capable of converting the exciting beams into the first color light beam and reflecting the first color light beam, and the light passing section is capable of being passed through by the exciting beams.

6. The illumination system according to claim 5, further comprising:
a beam combining unit disposed on transmission paths of the exciting beams reflected by the second reflector, the exciting beams passing through the light passing section and the first color light beam from the first phosphor reflecting section to combine the first color light beam from the first phosphor reflecting section and the exciting beams passing through the light passing section.

7. The illumination system according to claim 6, further comprising:
a reflecting module disposed on the transmission paths of the exciting beams passing through the light passing section to reflect the exciting beams back to the beam combining unit.

8. The illumination system according to claim 1, wherein a ray, transmitted along the optical axis, in the exciting beams emitted from the first light emitting elements is reflected by the first reflector, is reflected by the second reflector, penetrates through the hole, and is transmitted to the wavelength-converting unit in sequence.

9. A projection apparatus comprising:
an illumination system comprising:
a plurality of first light emitting elements capable of emitting a plurality of exciting beams;
a plurality of collimator lenses respectively disposed on transmission paths of the exciting beams emitted by the first light emitting elements and being capable of collimating the exciting beams emitted by the first light emitting elements;
a wavelength-converting unit disposed on the transmission paths of the exciting beams to convert the exciting beams into a first color light beam, wherein a wavelength of the first color light beam is different from a wavelength of the exciting beams;
a first reflector disposed on the transmission paths of the exciting beams and disposed between the first light emitting elements and the wavelength-converting unit, wherein the first reflector has a hole and the first reflector is a concave mirror, the collimator lenses are respectively disposed between the first light emitting elements and the first reflector, and the exciting beams collimated by the collimator lenses are reflected by the first reflector;
a second reflector disposed between the first light emitting elements and the first reflector to reflect the exciting beams, reflected by the first reflector, to the wavelength-converting unit, wherein the second reflector is a convex mirror and the exciting beams reflected by the second reflector are transmitted to the wavelength-converting unit through the hole; and
a supporting substrate, wherein the first light emitting elements are disposed on the supporting substrate to surround a central axis of the second reflector and are arranged extendedly in at least a direction perpendicular to the central axis of the second reflector, so that an optical axis of each of the first light emitting elements is parallel to the exciting beams reflected by the second reflector;
a light valve disposed on the transmission path of the first color light beam to convert the first color light beam into an image light beam; and
a projection lens disposed on a transmission path of the image light beam.

10. The projection apparatus according to claim 9, further comprising:
a beam splitting unit disposed on transmission paths of the exciting beams and the first color light beam and disposed between the second reflector and the wavelength-converting unit, wherein the beam splitting unit transmits the exciting beams reflected by the second reflector to the wavelength-converting unit and transmits the first color light beam from the wavelength-converting unit to the light valve.

11. The projection apparatus according to claim 10, wherein the beam splitting unit is a dichroic unit capable of allowing one of the exciting beam and the first color light beam to pass through and capable of reflecting the other of the exciting beam and the first color light beam.

12. The projection apparatus according to claim 10, further comprising:
at least one second light emitting element capable of emitting a second color light beam; and
a beam combining unit disposed on transmission paths of the first color light beam and the second color light beam to combine the first color light beam and the second color light beam, and the beam combining unit transmits the first color light beam and the second color light beam to the light valve, wherein the light valve converts the first color light beam and the second color light beam into the image light beam.

13. The projection apparatus according to claim 9, wherein the wavelength-converting unit further comprises a light passing section and a first phosphor reflecting section, wherein the light passing section and the first phosphor reflecting section are capable of moving into the transmission paths of the exciting beams by turns, the first phosphor reflecting section is capable of converting the exciting beams into the first color light beam and reflecting the first color light beam, and the light passing section is capable of being passed through by the exciting beams.

14. The projection apparatus according to claim 13, further comprising:
a beam combining unit disposed on transmission paths of the exciting beams reflected by the second reflector, the exciting beams passing through the light passing section and the first color light beam from the first phosphor reflecting section to combine the first color light beam from the first phosphor reflecting section and the exciting beams passing through the light passing section, the beam combining unit transmits the first color light beam and the exciting beams to the light valve, and the light valve converts the first color light beam and the exciting beams into the image light beam.

15. The projection apparatus according to claim 14, further comprising:
a reflecting module disposed on the transmission paths of the exciting beams passing through the light passing section to reflect the exciting beams back to the beam combining unit.

16. The projection apparatus according to claim 9, wherein a ray, transmitted along the optical axis, in the exciting beams emitted from the first light emitting elements is reflected by the first reflector, is reflected by the second reflector, penetrates through the hole, and is transmitted to the wavelength-converting unit in sequence.

* * * * *